United States Patent [19]

Onishi

[11] Patent Number: 5,774,538
[45] Date of Patent: Jun. 30, 1998

[54] EXCHANGE SERVICE STARTING SYSTEM

[75] Inventor: Hirofumi Onishi, Kawasaki, Japan

[73] Assignee: Fujitsu Limited, Kanagawa, Japan

[21] Appl. No.: 534,143

[22] Filed: Sep. 26, 1995

[30]  Foreign Application Priority Data

Nov. 8, 1994 [JP] Japan ..................................... 6-273260

[51] Int. Cl.⁶ ...................................................... H04M 3/42
[52] U.S. Cl. ........................... 379/201; 379/229; 379/240
[58] Field of Search .................................... 379/201, 202, 379/207, 212, 215, 229, 240

[56]  References Cited

U.S. PATENT DOCUMENTS

| | | | |
|---|---|---|---|
| 5,131,024 | 7/1992 | Pugh et al. ................................. | 379/67 |
| 5,394,463 | 2/1995 | Fischell et al. .......................... | 379/201 |
| 5,442,689 | 8/1995 | Buttitta et al. ........................... | 379/201 |
| 5,475,746 | 12/1995 | Miller et al. ............................. | 379/201 |
| 5,479,495 | 12/1995 | Blumhart ................................. | 379/207 |
| 5,528,677 | 6/1996 | Butler et al. ............................. | 379/196 |

*Primary Examiner*—Daniel S. Hunter
*Attorney, Agent, or Firm*—Helfgott & Karas, P.C.

[57]  ABSTRACT

An exchange service starting system subject to a minimum of processing burdens without limiting the scope of exchange services available to subscribers. A number dialed by a subscriber placing a call is analyzed by a number analyzing unit. The result of analysis is stored into a number analysis result memory. Upon receipt of a service start request signal from the subscriber during the call, a signal analyzing unit references the content of the memory. If the memory is found to contain a predetermined specific number, the signal analyzing unit starts a signal output unit to output the service start request signal to a specific exchange. If the memory content is other than the specific number, the signal analyzing unit starts a service request processing unit so that the exchange in question will offer a locally available exchange service.

6 Claims, 6 Drawing Sheets

EXCHANGE SERVICE STARTING SYSTEM

BACKGROUND OF THE INVENTION

1. Field of the Invention

The present invention relates to an exchange service starting system for use in exchanges constituting a telephone switched network.

2. Description of the Related Art

Recently, telephone switched networks offer an increasing number of exchange serves to meet diverse subscriber demands. Not only the ordinary exchanges accommodating subscribers but also specific exchanges such as international exchanges furnish more exchange-related services than ever. Altogether, today's networks provide numerous exchange services to choose from. Services available from subscriber-accommodating exchanges include illustratively call transfer and three-party calls; services offered by specific exchanges comprise operator recall and follow-on call, among others.

Most of such exchange services are started in response to a service start request signal generated by a subscriber (who pushes the hook button or a special button on his telephone terminal). Upon receipt of the service start request signal, the exchange accommodating the signal-originating subscriber checks to see if the signal is requesting the start of a locally available service of that exchange or of a service offered by a specific exchange. If the latter is the case, the service start request signal must be routed to an external exchange.

That is, whenever the exchange receives a service start request signal from any of its subscribers, the exchange needs to know whether the signal is requesting the start of any one of its services or one of those provided by an external exchange.

A typical conventional exchange service starting system works as follows: when a service start request signal is received during a call from a subscriber, the local exchange (which accommodates the subscriber) checks to see if the services offered locally to that subscriber from the exchange include what is requested to be started by the signal. If there is such a service corresponding to the service start request signal, the local exchange offers and executes the service. If the requested service is not available locally, the service start request signal is sent out to an external exchange as a request for an exchange service from a specific exchange.

One disadvantage of this conventional system is the limited scope of available exchange services. For example, where a subscriber wishes to get an exchange service of a specific exchange, he may not get one from that exchange if the local exchange includes among its various exchange services (available by use of a service start request signal) what is being requested by the subscriber in question. Another disadvantage of the conventional system is excess processing burdens on the system resulting from the discrimination of request signals, as more and more exchange services are being offered. A further disadvantage is the inability of the conventional system to allow the subscriber to switch at his own discretion between two types of exchange service using a service start request signal halfway through the current call, one service type offered locally, the other provided by a specific exchange.

Another conventional exchange service starting system works as follows: the system first identifies the attribute of the trunk line being used for the call. If the trunk line in question is found to inhibit transmission of a service start request signal, the system regards this as representative of a request for the local exchange to start its exchange service. The system then causes the local exchange to offer and execute its exchange service. If the trunk line is found to permit transmission of a service start request signal, the system regards this as indicative of a request for a specific exchange to start its exchange service. The system then transfers the service start request signal to an external exchange in the direction of that specific exchange.

The latter conventional method requires that the trunk lines between exchanges be divided into two kinds of lines: those permitting transmission of service start request signals, and those inhibiting such transmission. This trunk line arrangement runs counter to the efforts at utilizing the trunk lines efficiently.

SUMMARY OF THE INVENTION

It is therefore an object of the present invention to provide an exchange service starting system subject to a minimum of processing burdens and capable of making efficient use of trunk lines without limiting the scope of exchange services available to subscribers.

It is another object of the invention to provide an exchange service starting system allowing a subscriber to switch at his own discretion between two types of exchange service using a service start request signal halfway through the current call, one service type offered locally, the other provided by a specific exchange.

In accordance with an aspect of the present invention, there is provided an exchange service starting system for use by an exchange which accommodates a plurality of subscribers and which is connected via a trunk line to other exchanges including a specific exchange. This exchange service starting system comprises: number analyzing means for analyzing a number dialed by a subscriber placing a call; a number analysis result memory for storing a result of analysis by the number analyzing means; signal output means for outputting a service start request signal onto the trunk line; and signal analyzing means for receiving the service start request signal from the subscriber during the call. Upon receipt of the service start request signal from the subscriber, the signal analyzing means references the result of analysis stored in the number analysis result memory to see if the subscriber has sent the signal after use of a predetermined specific number. The signal analyzing means starts the signal output means if the subscriber is found to have sent the signal after using the specific number, the service start request signal being thereupon regarded as a service start request for the specific exchange related to the call.

With this exchange service starting system, a subscriber-dialed number (specific number) is first analyzed. A check is then made on the result of the analysis to see whether the service start request signal from the subscriber is a local service start request for the exchange in question or a service start request for the specific exchange. Unlike conventional systems, the inventive system does not require the telephone switched network to restrict the scope of available services to subscribers. While offering more services than before, the system is exempt from increased processing burdens.

In accordance with another aspect of the invention, there is provided an exchange service starting system for use by an exchange which accommodates a plurality of subscribers and which is connected via a trunk line to other exchanges including a specific exchange. This exchange service starting system comprises: number analyzing means for analyzing a number dialed by a subscriber placing a call; a number analysis result memory for storing a result of analysis by the number analyzing means; signal output means for outputting a service start request signal onto the trunk line; and signal analyzing means for receiving the service start request signal from the subscriber during the call. After receiving the service start request signal from the subscriber, the signal analyzing means checks to see if the subscriber has dialed a predetermined specific number. The signal analyzing means starts the signal output means when receiving any service start request signal from the subscriber subsequently to the dialed specific number, any such subsequent service start request signal being regarded as a service start request for the specific exchange related to the call.

With this exchange service starting system in use, a subscriber dials a specific number during the current call following transmission of a service start request signal. This allows the subscriber to change or choose at will the significance of the service start request signal or of any service start request signal sent subsequently thereto. That is, the subscriber may specify at his own discretion whether the transmitted signal is to be a local service start request for the exchange in question or a service start request for the specific exchange.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
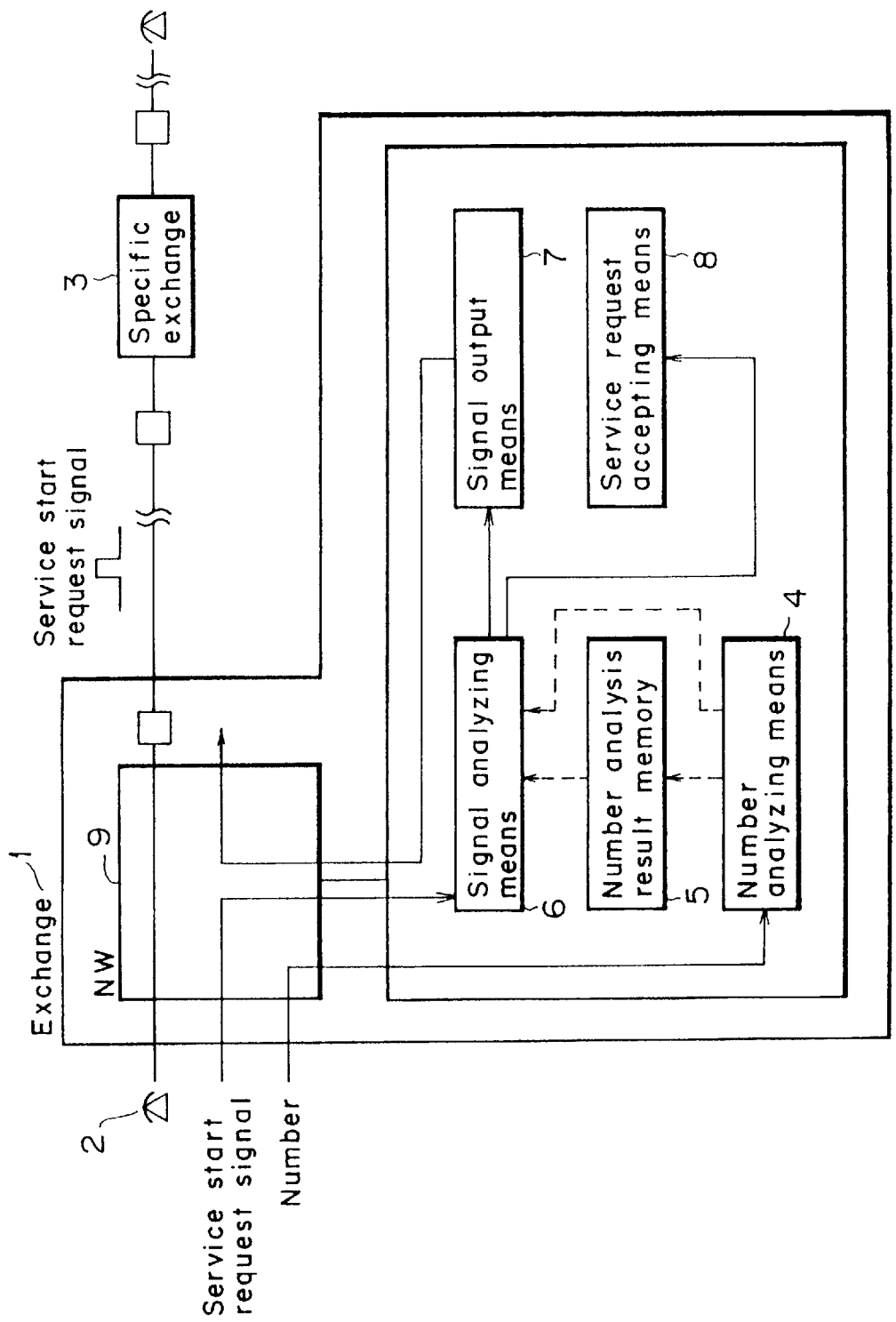
FIG. 1 is a block diagram illustrating the operating principle of the present invention.

The operating principle of the present invention will now be described with reference to the block diagram of FIG. 1. An exchange 1 to which the invention is applied accommodates a plurality of subscribers 2, and is connected via a trunk line to other exchanges including a specific exchange 3. The exchange 1 further includes number analyzing means 4 for analyzing the number dialed by a subscriber 2 placing a call; a number analysis result memory 5 for storing the result of analysis by the number analyzing means; signal analyzing means 6 for receiving a service start request signal from the subscriber 2 during the call; signal output means 7 for outputting a service start request signal onto the trunk line; and service request accepting means 8 for accepting the request for an exchange service. Reference numeral 9 denotes a network unit (a channel unit). In operation, the signal analyzing means 6 performs one of the following processes:

(1) First process (advance declaration method 1)

Upon receipt of a service start request signal from the subscriber 2, the signal analyzing means 6 references the result of analysis held in the number analysis result memory 5. If the reference allows the signal analyzing means 6 to verify that the subscriber 2 has sent the service start request signal after using a predetermined specific number, the signal analyzing means 6 starts the signal output means 7 by regarding the signal as a service start request for the specific exchange 3 related to the call.

(2) Second process (advance declaration method 2)

On receiving a service start request signal from the subscriber 2, the signal analyzing means 6 references the result of analysis held in the number analysis result memory 5. If the reference allows the signal analyzing means 6 to ascertain that the subscriber 2 has sent the service start request signal after using a predetermined specific number, the signal analyzing means 6 starts the service request accepting means 8 by regarding the signal as a service start request for the local exchange 1. If the subscriber 2 is not found to have sent the service start request signal after using the specific number, the signal analyzing means 6 starts the signal output means 7 by regarding the signal as a service start request for the specific exchange 3 related to the call.

(3) Third process (halfway designation method 1)

After receiving the service start request signal from the subscriber 2, the signal analyzing means 6 checks to see if the subscriber 2 has dialed a predetermined specific number. If the subscriber 2 is found to have dialed the specific number and if any service start request signal is detected from the subscriber 2 subsequently to the dialed specific number, the signal analyzing means 6 starts the signal output means 7 by regarding any such signal as a service start request for the specific exchange 3 related to the call.

(4) Fourth process (halfway designation method 2)

After receiving the service start request signal from the subscriber 2, the signal analyzing means 6 checks to see if the subscriber 2 has dialed a predetermined specific number. If the subscriber 2 is found to have dialed the specific number and if any service start request signal is detected from the subscriber 2 subsequently to the dialed specific number, the signal analyzing means starts the service request accepting means 8 by regarding any such signal as a service start request for the local exchange 1.

(5) Fifth process (direct designation method 1)

After receiving the service start request signal from the subscriber 2, the signal analyzing means 6 checks to see if the subscriber 2 has dialed a predetermined specific number. If the subscriber 2 is found to have dialed the specific number, the signal analyzing means starts the signal output means 7 by regarding the received service start request signal as a service start request for the specific exchange 3 related to the call.

(6) Sixth process (direct designation method 2)

After receiving the service start request signal from the subscriber 2, the signal analyzing means 6 checks to see if the subscriber 2 has dialed a predetermined specific number. If the subscriber 2 is found to have dialed the specific number, the signal analyzing means 6 starts the service request accepting means 8 by regarding the received service start request signal as a service start request for the local exchange 1.

According to the invention, analyzing the subscriber-dialed number (specific number) makes it possible to verify whether the service start request signal from the subscriber is a service start request for the local exchange or for the specific exchange. Thus unlike conventional systems, the system of the invention does not require the network to restrict its scope of exchange services available to subscriber. In addition, the inventive system is not overburdened as more and more services are being offered on the network. Because there is no need to divide the trunk lines into portions with different attributes to distinguish the way the service start request signal is to be handled therethrough, the inventive system makes effective use of the furnished trunk lines between exchanges.

Furthermore, when any one of the third through the sixth process outlined above is adopted, the subscriber may dial halfway through the current call a predetermined specific number following transmission of a service start request signal. The process then allows the subscriber to select or change at will the significance of the current service start request signal or a service start request signal subsequent thereto. That is, the subscriber may specify at his own discretion that the signal is to be a service start request either for the local exchange or for the specific exchange.

First Embodiment

Figure 2:
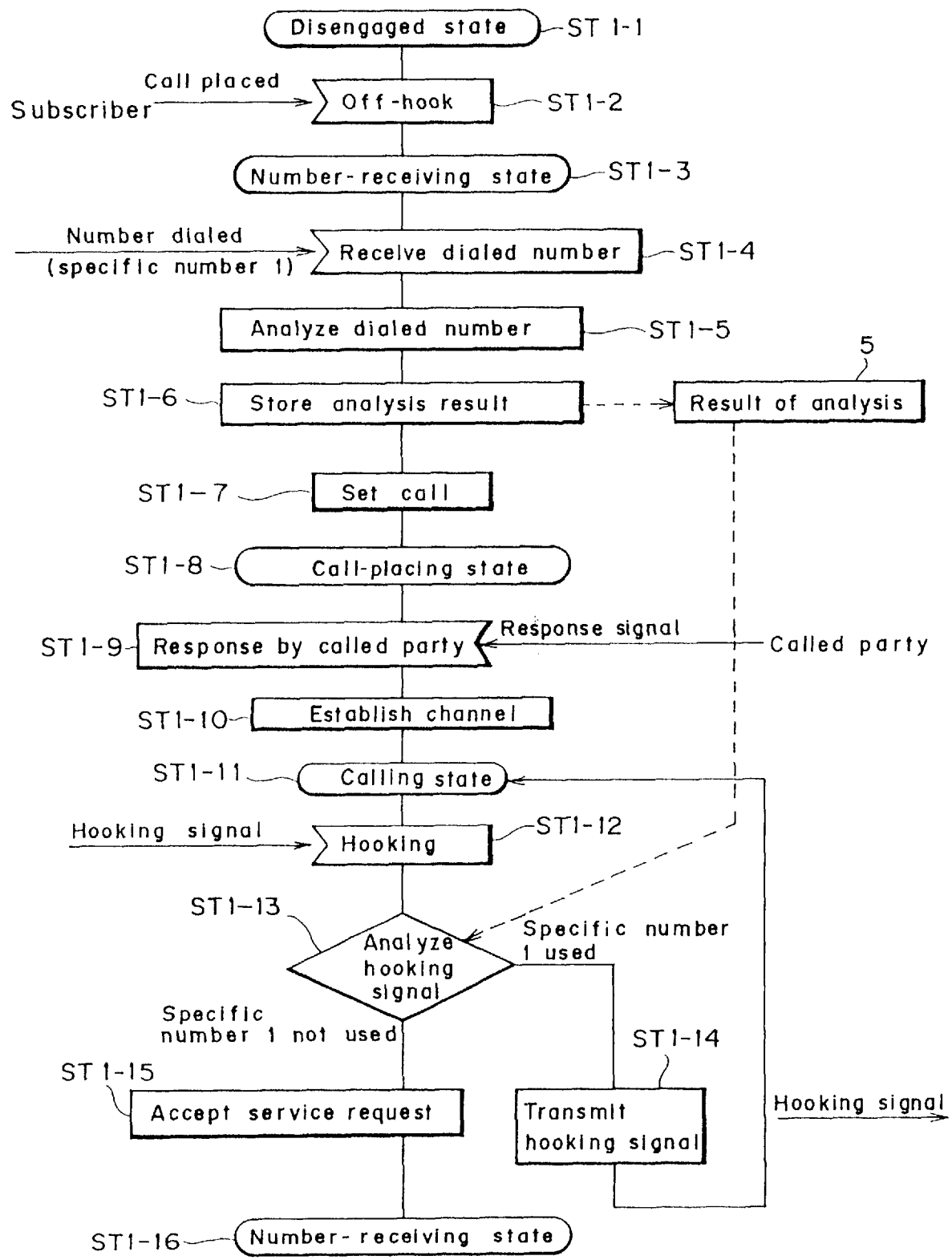
FIG. 2 is a flowchart of steps showing how a first embodiment of the invention works.

FIG. 2 is a flowchart of steps showing how the first embodiment of the invention works. The first embodiment adopts the first inventive process outlined above.

In a disengaged state (step 1-1), a subscriber goes off-hook (step 1-2) to enter a number-receiving state (step 1-3). The subscriber then dials a predetermined specific number (specific number 1). On receiving the dialed number from the subscriber (step 1-4), the number analyzing means 4 analyzes the dialed number received (step 1-5). The result of the analysis is stored into the number analysis result memory 5 (step 1-6). On the basis of the specific number 1 dialed by the subscriber (i.e., the calling party), a call is set with respect to the called party (step 1-7) and the called party is being called in a call-placing state (step 1-8). When the called party responds to the placed call (step 1-9), a channel is established (step 1-10) and a calling state is entered (step 1-11).

A single push by the calling party on the hook button of his analog telephone terminal during the current call transmits a service start request signal (called the hooking signal hereunder). Upon receipt of the hooking signal (step 1-12), the signal analyzing means 6 judges (step 1-13) the result of the number analysis held in the number analysis result memory 5. If the result of the analysis in the number analysis result memory 5 is found to be the specific number 1, i.e., if the calling party is found to have placed the call using the specific number 1, the signal analyzing means 6 starts the signal output means 7. When thus activated, the signal output means 7 transmits the hooking signal or its equivalent to the specific exchange 3 via an appropriate trunk line (step 1-14). Step 1-11 is then reached again in which the calling state is restored.

If the result of the analysis held in the number analysis result memory 5 is found to be other than the specific number 1 in step 1-13, i.e., if the calling party is found to have placed the call using a number other than the specific number 1, the signal analyzing means 6 starts the service request accepting means 8 (step 1-15). This establishes a number-receiving state in which to receive other specific numbers representing local exchange services that may be desired by the subscriber (step 1-16).

As described, the first embodiment first judges the number dialed by the subscriber placing the call. If the dialed number turns out to be the specific number 1, the hooking signal from the subscriber is treated as a service start request for the specific exchange 3. If the dialed number is found to be a number other than the specific number 1, the hooking signal from the subscriber is handled as a service start request for the local exchange 1. This means that, unlike conventional exchange service starting systems, growing varieties of exchange services offered to subscribers leave the inventive system exempt from overburdens of processing. With no need to divide the trunk lines into portions with different attributes to distinguish the way the hooking signal is to be treated therethrough, the inventive system makes effective use of the furnished trunk lines between exchanges.

Second Embodiment

Figure 3:
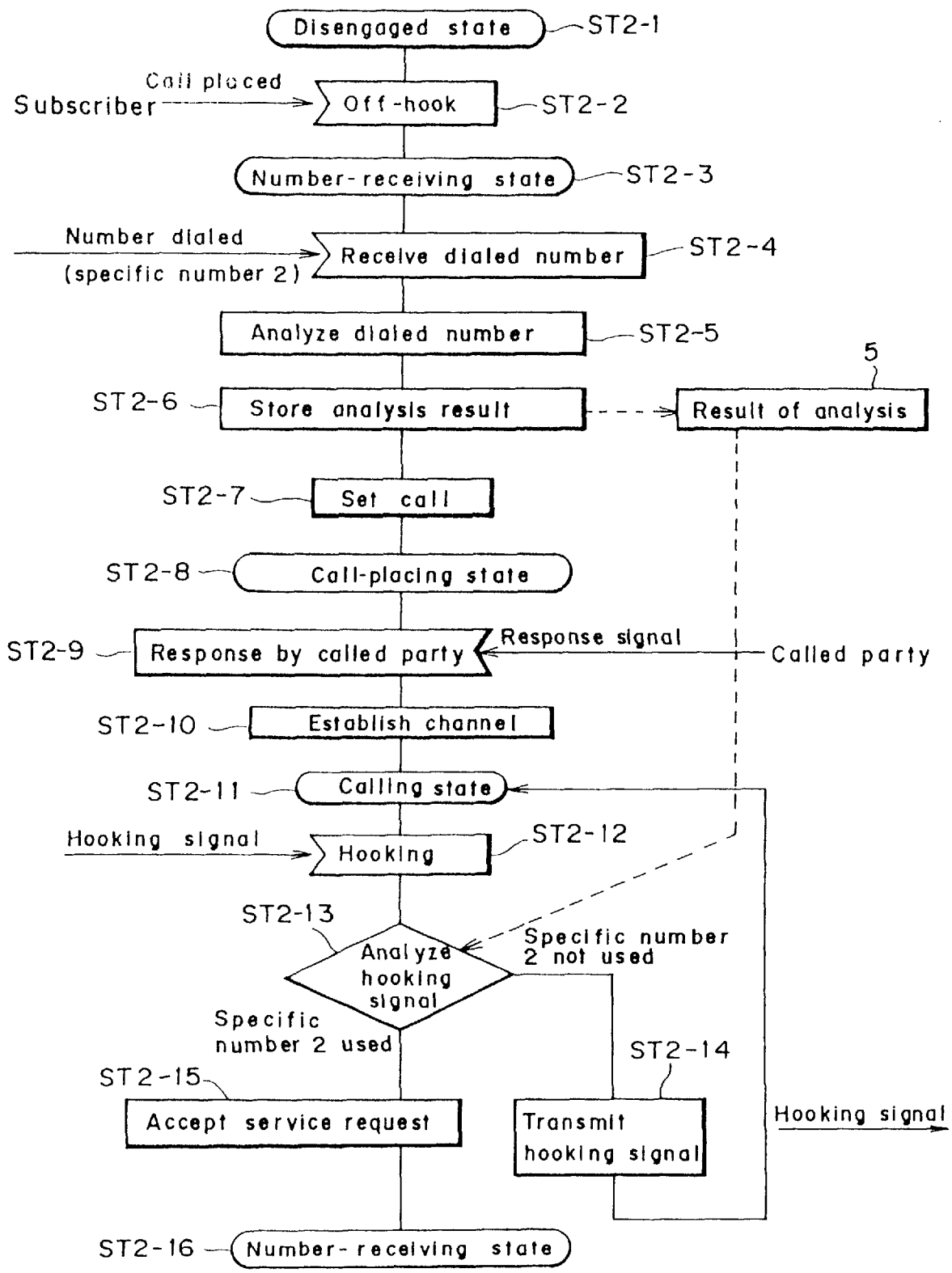
FIG. 3 is a flowchart of steps showing how a second embodiment of the invention works.

FIG. 3 is a flowchart of steps showing how the second embodiment of the invention works. The second embodiment adopts the second inventive process outlined earlier.

In a disengaged state (step 2-1), a subscriber goes off-hook (step 2-2) to enter a number-receiving state (step 2-3). The subscriber then dials a predetermined specific number (specific number 2). On receiving the dialed number from the subscriber (step 2-4), the number analyzing means 4 analyzes the dialed number received (step 2-5). The result of the analysis is stored into the number analysis result memory 5 (step 2-6). On the basis of the specific number 2 dialed by the subscriber (i.e., the calling party), a call is set with respect to the called party (step 2-7) and the called party is being called in a call-placing state (step 2-8). When the called party responds to the placed call (step 2-9), a channel is established (step 2-10) and a calling state is entered (step 2-11).

A single push by the calling party on the hook button of his analog telephone terminal during the current call transmits a hooking signal. Upon receipt of the hooking signal (step 2-12), the signal analyzing means 6 judges the result of the number analysis placed in step 2-6 into the number analysis result memory 5 (step 2-13). If the result of the analysis held in the number analysis result memory 5 is found to be other than the specific number 2, i.e., if the calling party is found to have placed the call using a number other than the specific number 2, the signal analyzing means 6 starts the signal output means 7. When thus activated, the signal output means 7 transmits the hooking signal or its equivalent to the specific exchange 3 via an appropriate trunk line (step 2-14). Step 2-11 is then reached again in which the calling state is restored.

If, in step 2-13, the result of the analysis in the number analysis result memory 5 is found to be the specific number 2, i.e., if the calling party is found to have placed the call using the specific number 2, the signal analyzing means 6 starts the service request accepting means 8 (step 2-15). This establishes a number-receiving state in which to receive other specific numbers representing local exchange services that may be desired by the subscriber (step 2-16).

As described, the second embodiment initially judges the number dialed by the subscriber placing the call. If the dialed number is found to be a number other than the specific number 2, the hooking signal from the subscriber is handled as a service start request for the specific exchange 3. If the dialed number turns out to be the specific number 2, the hooking signal from the subscriber is treated as a service start request for the local exchange 1. This also means that, as opposed to conventional exchange service starting systems, an increasing number of exchange services offered to subscribers still leave the inventive system exempt from excess loads of processing. Since there is no need to divide the trunk lines into portions with different attributes to distinguish the way the hooking signal is to be treated therethrough, the inventive system makes effective use of the furnished trunk lines between exchanges.

Third Embodiment

Figure 4:
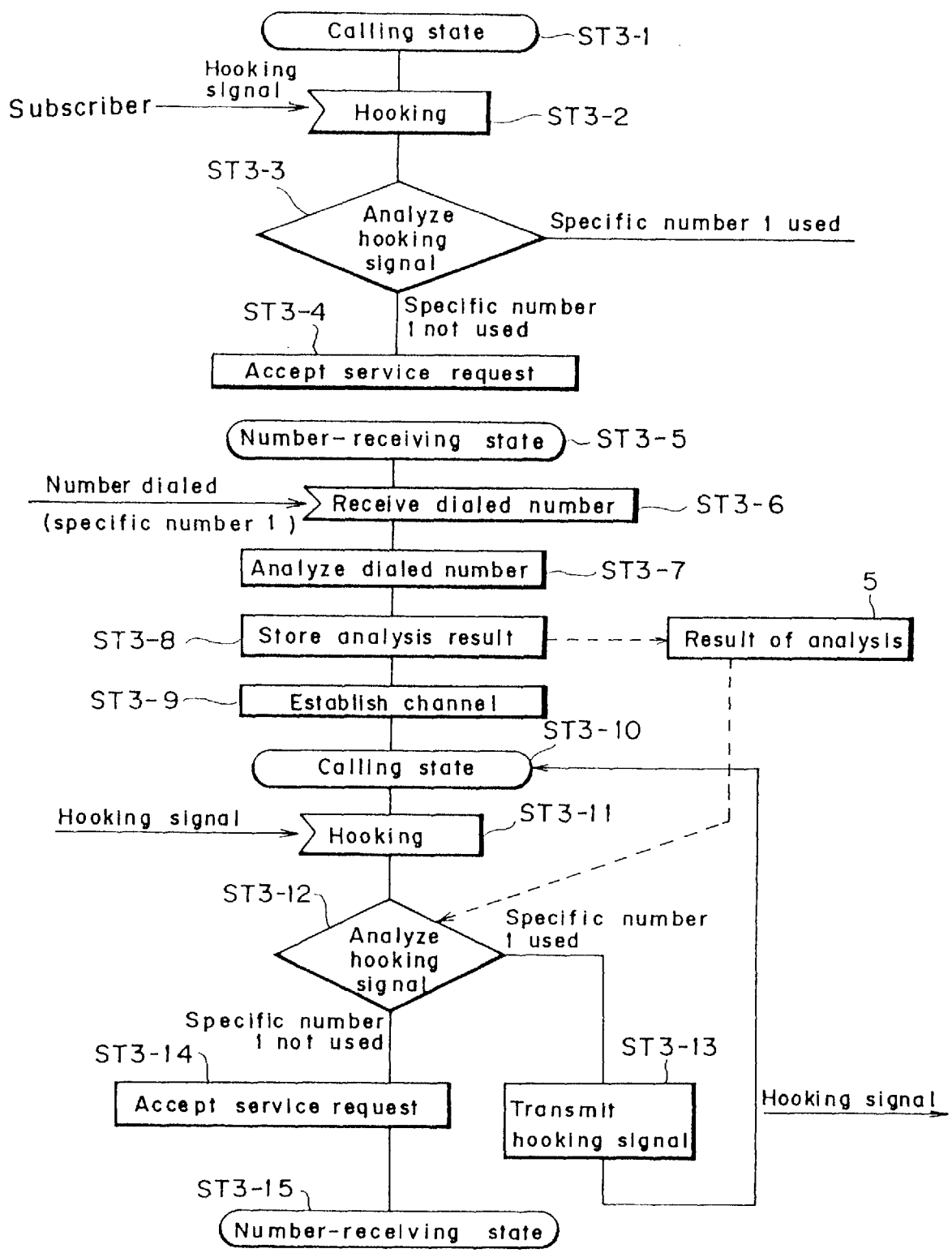
FIG. 4 is a flowchart of steps showing how a third embodiment of the invention works.

FIG. 4 is a flowchart of steps showing how the third embodiment of the invention works. The third embodiment adopts the third inventive process outlined earlier. For this embodiment, it is assumed that steps 1-1 through 1-10 of the first embodiment have been completed before a calling state is entered.

In the calling state (step 3-1), the signal analyzing means 6 receives the hooking signal from the subscriber (step 3-2). The signal analyzing means 6 then judges (step 3-3) the result of the number analysis stored (in step 1-6 of the first embodiment) into the number analysis result memory 5. If the result of the analysis in the number analysis result memory 5 is found to be the specific number 1, i.e., if the calling party is found to have placed the call using the specific number 1, the signal analyzing means 6 starts the signal output means 7 in the same manner as in step 1-14 of the first embodiment. When thus activated, the signal output means 7 transmits the hooking signal or its equivalent to the specific exchange 3 via an appropriate trunk line.

If, in step 3-3, the result of the analysis held in the number analysis result memory 5 is found to be other than the specific number 1, i.e., if the calling party is found to have placed the call using a number other than the specific number 1, the signal analyzing means 6 starts the service request accepting means 8 (step 3-4) and causes a number-receiving state to be entered (step 3-5). Then with a dialed number received from the subscriber (step 3-6), the number analyzing means 4 analyzes the received number (step 3-7). The result of the analysis is stored into the number analysis result memory 5 (step 3-8), and a channel is reestablished (step 3-9).

Again in the calling state (step 3-10), the signal analyzing means 6 receives the hooking signal from the subscriber (step 3-11). This prompts the signal analyzing means 6 to judge (step 3-12) the result of the number analysis stored in step 3-8 into the number analysis result memory 5. If the result of the analysis in the number analysis result memory 5 is found to be the specific number 1, the signal analyzing means 6 starts the signal output means 7. When thus activated, the signal output means 7 transmits the hooking signal or its equivalent to the specific exchange 3 via an appropriate trunk line (step 3-13). Thereafter, step 3-10 is again reached in which the calling state is restored.

If, in step 3-12, the result of the analysis stored in step 3-8 into the number analysis result memory 5 is found to be other than the specific number 1, the signal analyzing means 6 starts the service request accepting means 8 (step 3-14). This again establishes the number-receiving state (step 3-15) in which to receive other specific numbers representing local exchange services that may be desired by the subscriber.

As described and according to the third embodiment, the subscriber wishing to get an exchange service of the local exchange 1 dials a number other than the specific number 1 following transmission of the hooking signal. The dialing by the subscriber allows the current hooking signal to be handled as a service start request for the local exchange 1. When the subscriber wishes to get an exchange service of the specific exchange 3, the subscriber dials the specific number 1 following transmission of the hooking signal. This permits any hooking signal subsequent to the current signal to be treated as a service start request for the specific exchange 3. In this manner, whenever the subscriber wishes to get an exchange service of the specific exchange 3 instead of the service of the local exchange 1 during the current call, the subscriber can do so at will.

Fourth Embodiment

Figure 5:
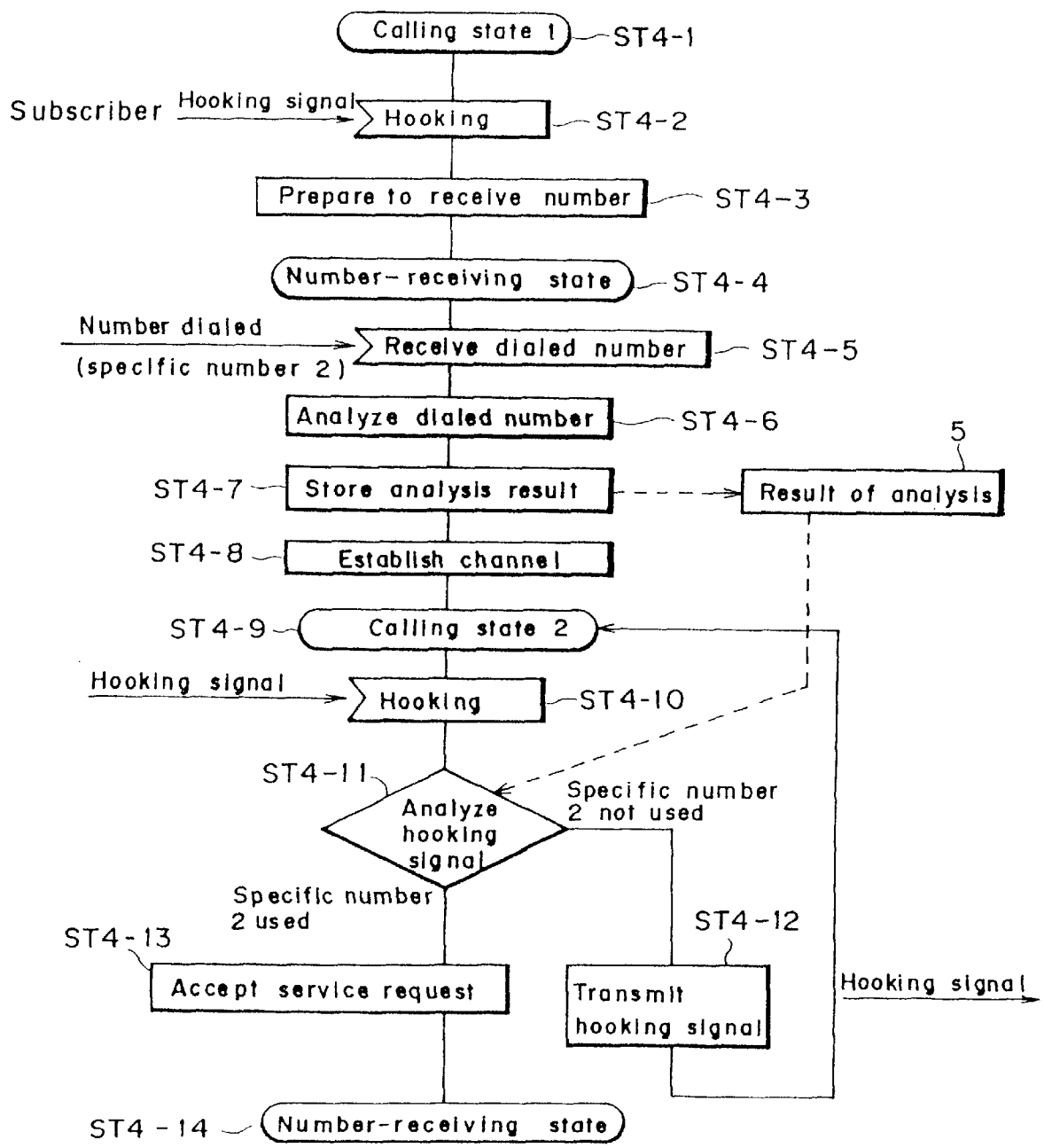
FIG. 5 is a flowchart of steps showing how a fourth embodiment of the invention works.

FIG. 5 is a flowchart of steps showing how the fourth embodiment of the invention works. The fourth embodiment adopts the fourth inventive process outlined earlier.

In a calling state (step 4-1), the signal analyzing means 6 receives the hooking signal from the subscriber (step 4-2). After preparations for receiving a number (step 4-3), a number-receiving state is entered (step 4-4). Upon receipt of a dialed number (specific number 2) from the subscriber (step 4-5), the number analyzing means 4 analyzes the received number (step 4-6). The result of the analysis is stored into the number analysis result memory 5 (step 4-7).

Then a channel is reestablished (step 4-8) and the calling state is restored (step 4-9). When receiving the hooking signal from the subscriber (step 4-10), the signal analyzing means 6 judges (step 4-11) the result of the number analysis stored in step 4-7 into the number analysis result memory 5. If the memory content is found to be other than the specific number 2, the signal analyzing means 6 starts the signal output means 7. When thus activated, the signal output means 7 transmits the hooking signal or its equivalent to the specific exchange 3 via an appropriate trunk line (step 4-12). Thereafter, step 4-9 is again reached in which the calling state is restored.

If, in step 4-11, the result of the analysis stored in step 4-7 into the number analysis result memory 5 is found to be the specific number 2, the signal analyzing means 6 starts the service request accepting means 8 (step 4-13). This again establishes the number-receiving state (step 4-14) in which to receive other specific numbers representing local exchange services that may be desired by the subscriber.

As described and according to the fourth embodiment, the subscriber wishing to get an exchange service of the local exchange 1 dials the specific number 2 following transmission of the hooking signal. The dialing by the subscriber allows the current hooking signal to be handled as a service start request for the local exchange 1. When the subscriber wishes to get an exchange service of the specific exchange 3, the subscriber dials a number other than the specific number 2 following transmission of the hooking signal. This permits any hooking signal subsequent to the current signal to be treated as a service start request for the specific exchange 3. In this manner, whenever the subscriber wishes to get an exchange service of the specific exchange 3 instead of the service of the local exchange 1 during the current call, the subscriber can do so at will.

Fifth Embodiment

Figure 6:
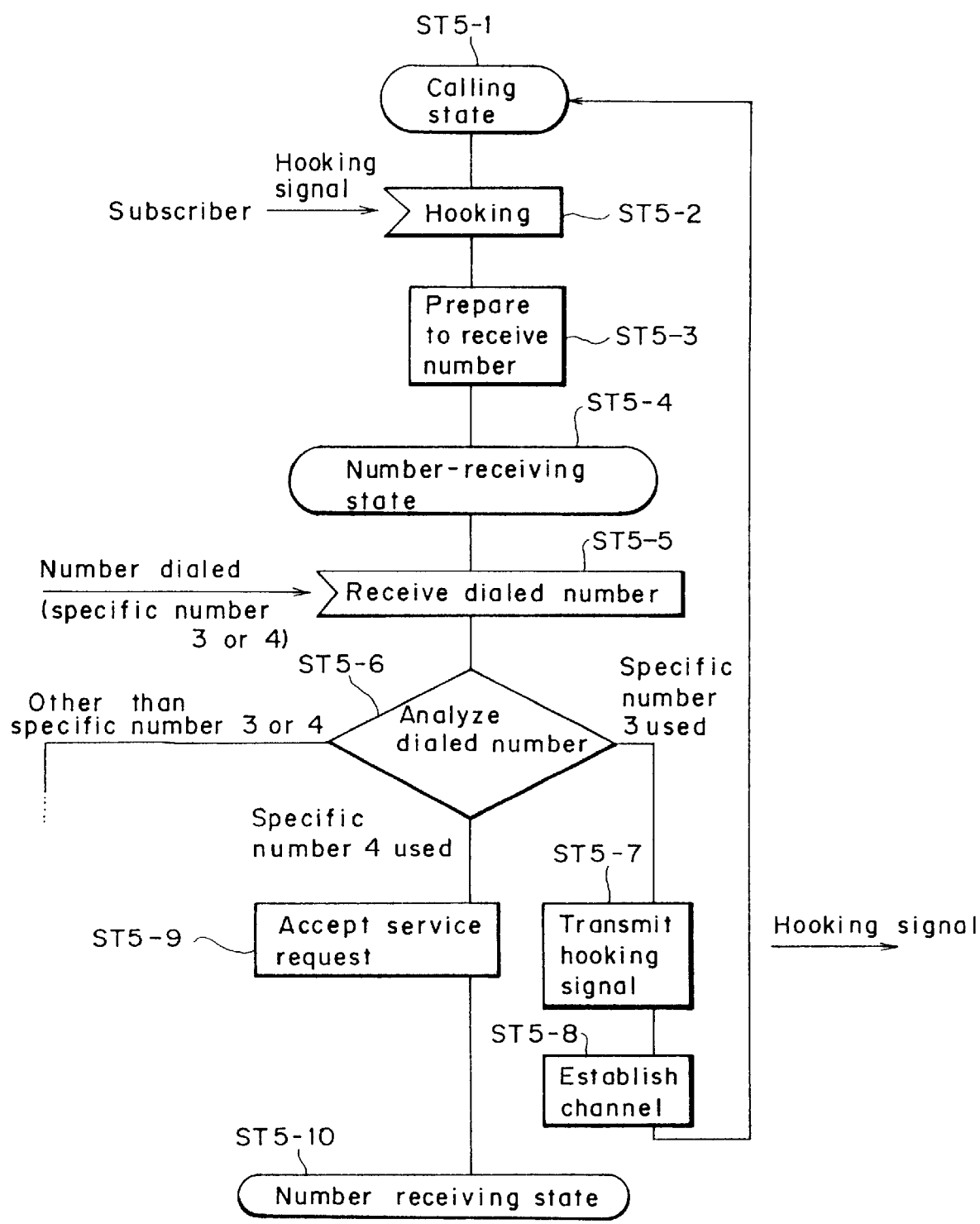
FIG. 6 is a flowchart of steps showing how a fifth embodiment of the invention works.

FIG. 6 is a flowchart of steps showing how the fifth embodiment of the invention works. The fifth embodiment adopts the fifth and the sixth inventive process outlined earlier.

In a calling state (step 5-1), the signal analyzing means 6 receives the hooking signal from the subscriber (step 5-2). After preparations for receiving a number (step 5-3), a number-receiving state is entered (step 5-4). In this state, a dialed number (specific number 3 or 4) is received from the subscriber (step 5-5).

The number analyzing means 4 analyzes the dialed number received, and the signal analyzing means 6 judges the result of the analysis (step 5-6). If the dialed number is found to be the specific number 3, the signal analyzing means starts the signal output means 7. In turn, the signal output means 7 transmits the hooking signal or its equivalent to the specific exchange 3 via an appropriate trunk line (step 5-7). Thereafter, a channel is reestablished (step 5-8) and the calling state is restored.

If, in step 5-6, the dialed number is found to be a specific number 4, the signal analyzing means 6 starts the service request accepting means 8 (step 5-9). This establishes a number-receiving state (step 5-10) in which to receive other specific numbers representing local exchange services that may be desired by the subscriber.

As described and according to the fifth embodiment, the subscriber may dial a predetermined specific number (specific number 3 or 4) following transmission of a hooking signal during the current call. Dialing the specific number 3 causes the current hooking signal to be handled as a service start request for the specific exchange 3; dialing the specific number 4 causes the current hooking signal to be treated as a service start request for the local exchange 1. In this manner, the subscriber may change the significance of the hooking signal at will during the current call.

As described, the exchange service starting system according to the invention does not require the network to restrict the scope of exchange services available to subscribers. With more and more exchange services being offered to subscribers, the inventive system is still exempt from overburdens of processing. Because there is no need to divide the trunk lines into portions for different uses, the inventive system makes effective use of the furnished trunk lines between exchanges. In addition, the system of the invention allows the subscriber to switch at will between two types of exchange service using a service start request signal halfway through the current call, one service type offered locally, the other provided by the specific exchange.

As many apparently different embodiments of this invention may be made without departing from the spirit and scope thereof, it is to be understood that the invention is not limited to the specific embodiments thereof except as defined in the appended claims.

What is claimed is:

1. An exchange service starting system for use by an exchange which accommodates a plurality of subscribers and which is connected via a trunk line to other exchanges including a specific exchange, said exchange service starting system comprising:

number analyzing means for analyzing a number dialed by a subscriber placing a call;

a number analysis result memory for storing a result of analysis by said number analyzing means;

signal output means for outputting a service start request signal onto said trunk line; and signal analyzing means for receiving the service start request signal from said subscriber during said call;

wherein, upon receipt of said service start request signal from said subscriber, said signal analyzing means references the result of analysis stored in said number analysis result memory to see if said subscriber has sent the signal after use of a predetermined specific number, said signal analyzing means further starting said signal output means if said subscriber is found to have sent the signal after using the specific number, said service start request signal being thereupon regarded as a service start request for said specific exchange related to said call.

2. An exchange service starting system for use by an exchange which accommodates a plurality of subscribers and which is connected via a trunk line to other exchanges including a specific exchange, said exchange service starting system comprising:

number analyzing means for analyzing a number dialed by a subscriber placing a call;

a number analysis result memory for storing a result of analysis by said number analyzing means;

signal output means for outputting a service start request signal onto said trunk line;

service request accepting means for accepting the request for an exchange service; and signal analyzing means for receiving the service start request signal from said subscriber during said call;

wherein, upon receipt of said service start request signal from said subscriber, said signal analyzing means references the result of analysis stored in said number analysis result memory to see if said subscriber has sent the signal after use of a predetermined specific number, said signal analyzing means starting said service request accepting means by regarding said service start request signal as a local service start request for said exchange if said subscriber is found to have sent the signal after using the specific number, said signal analyzing means further starting said signal output means by regarding said service start request signal as a service start request for said specific exchange related to said call if said subscriber is not found to have sent the signal using said specific number.

3. An exchange service starting system for use by an exchange which accommodates a plurality of subscribers and which is connected via a trunk line to other exchanges including a specific exchange, said exchange service starting system comprising:

number analyzing means for analyzing a number dialed by a subscriber placing a call;

a number analysis result memory for storing a result of analysis by said number analyzing means;

signal output means for outputting a service start request signal onto said trunk line; and signal analyzing means for receiving the service start request signal from said subscriber during said call;

wherein, after receiving said service start request signal from said subscriber, said signal analyzing means checks to see if said subscriber has dialed a predetermined specific number, said signal analyzing means further starting said signal output means when, with said subscriber found to have dialed the specific number, any service start request signal is detected from said subscriber subsequently to the dialed specific number, any such subsequent service start request signal being regarded as a service start request for said specific exchange related to said call.

4. An exchange service starting system for use by an exchange which accommodates a plurality of subscribers and which is connected via a trunk line to other exchanges including a specific exchange, said exchange service starting system comprising:

number analyzing means for analyzing a number dialed by a subscriber placing a call;

a number analysis result memory for storing a result of analysis by said number analyzing means;

service request accepting means for accepting a request for an exchange service; and signal analyzing means for receiving a service start request signal from said subscriber during said call;

wherein, after receiving said service start request signal from said subscriber, said signal analyzing means checks to see if said subscriber has dialed a predetermined specific number, said signal analyzing means further starting said service request accepting means when, with said subscriber found to have dialed the specific number, any service start request signal is detected from said subscriber subsequently to the dialed specific number, any such subsequent service start request signal being regarded as a local service start request for said exchange.

5. An exchange service starting system for use by an exchange which accommodates a plurality of subscribers and which is connected via a trunk line to other exchanges including a specific exchange, said exchange service starting system comprising:

number analyzing means for analyzing a number dialed by a subscriber placing a call;

signal output means for outputting a service start request signal onto said trunk line; and signal analyzing means for receiving the service start request signal from said subscriber during said call;

wherein, after receiving said service start request signal from said subscriber, said signal analyzing means checks to see if said subscriber has dialed a predetermined specific number, said signal analyzing means further starting said signal output means when said subscriber is found to have dialed the specific number, said service start request signal being thereupon regarded as a service start request for said specific exchange related to said call.

6. An exchange service starting system for use by an exchange which accommodates a plurality of subscribers and which is connected via a trunk line to other exchanges including a specific exchange, said exchange service starting system comprising:

number analyzing means for analyzing a number dialed by a subscriber placing a call;

service request accepting means for accepting a request for an exchange service; and signal analyzing means for receiving a service start request signal from said subscriber during said call;

wherein, after receiving said service start request signal from said subscriber, said signal analyzing means checks to see if said subscriber has dialed a predetermined specific number, said signal analyzing means further starting said service request accepting means when said subscriber is found to have dialed the specific number, said service start request signal being thereupon regarded as a local service start request for said exchange.

* * * * *